United States Patent [19]

Murakami et al.

[11] 4,027,552

[45] June 7, 1977

[54] SPEED CHANGE GEAR SYSTEM

[75] Inventors: Noboru Murakami, Nagoya; Koichiro Hirosawa, Kariya; Kazuo Ohara; Koichi Matsuo, both of Toyota, all of Japan

[73] Assignee: Aisin Seiki Kabushiki Kaisha, Kariya, Japan

[22] Filed: Apr. 22, 1975

[21] Appl. No.: 571,019

[30] Foreign Application Priority Data

May 7, 1974 Japan ............................ 49-50594

[52] U.S. Cl. .................................. 74/765; 74/753
[51] Int. Cl.² ........................................ F16H 57/10
[58] Field of Search ............ 74/753, 765, 759, 758, 74/764

[56] References Cited
UNITED STATES PATENTS

| | | | |
|---|---|---|---|
| 1,814,096 | 7/1931 | Saki | 74/765 |
| 2,990,727 | 7/1961 | Miller | 74/765 X |
| 3,022,683 | 2/1962 | Simon | 74/759 |
| 3,077,795 | 2/1963 | Chambers et al. | 74/764 |
| 3,815,445 | 6/1974 | Gorrell et al. | 74/764 X |
| 3,835,732 | 9/1974 | Mori et al. | 74/765 X |
| 3,877,320 | 4/1975 | Iijima | 74/759 |

*Primary Examiner*—Samuel Scott
*Assistant Examiner*—Lance W. Chandler
*Attorney, Agent, or Firm*—Pierce, Scheffler & Parker

[57] ABSTRACT

A speed change gear system of the planetary gear type suited for applications within fluid couplings used upon automobiles includes three simple planetary gear sets of the single pinion type and the double pinion type, two clutch units, and three brake units. The movable members of the three planetary gear sets are suitably coupled to each other, and the brake units are suitably locked and unlocked so as to attain the desired speed ranges, that is, at least four forward drive speeds and at least one reverse drive speed.

5 Claims, 15 Drawing Figures

SPEED CHANGE GEAR SYSTEM

BACKGROUND OF THE INVENTION

1. Field of the Invention

The present invention relates generally to speed change gear systems and more particularly to a speed change gear system which is suited for applications with fluid couplings or torque converters employed within vehicles, especially automobiles.

2. Description of the Prior Art

It is desirable that the gear type speed change mechanism of automatic transmissions utilized upon large vehicles, such as for example, trucks and buses should be capable of shifting between at least four forward drive speeds and operating with at least one reverse drive speed. This speed changing mechanism may be realized by suitably combining three, four or even more simple sets of planetary gears of the single pinion or the double pinion type, a variety of combinations of which may be considered. Within any combination of such planetary gear sets, the following conditions are desired to be satisfied:

1. The output shaft of the transmission should be connected with the same element of the planetary gear sets within each speed range.
2. In order to reduce the peripheral speed of bearings of each element of the planetary gear set, the number of revolutions should be as small as possible.
3. The load on the gear teeth, that is, the tangential force, on each gear should be small so as to maintain the strength of the gear teeth.
4. The gear set should meet the meshing conditions thereof for the number of teeth. The sun gear whose diameter is to be minimized, as well as each planetary pinion gear, should have the necessary number of teeth.
5. Within each planetary gear set, the coupling relationship among the elements should be simple and the distance from each other should be small.
6. When attaining speed shifts by frictional coupling means during forward driving, such speed shifts should be available through one coupling means alone.

Conventional systems have failed to efficiently attain the aforementioned conditions.

SUMMARY OF THE INVENTION

Accordingly, it is an object of the present invention to provide an efficient speed change gear mechanism of the planetary gear type which is able to provide at least four forward drive speeds and one reverse drive speed.

The foregoing and other objects are achieved to the present invention through the provision of a speed change gear mechanism employing three simple planetary gear sets of the single pinion type or double pinion type, two clutch units, and three brake units. The movable members of the three planetary gear sets are suitably coupled to each other, and the brake units are suitably locked and unlocked so as to attain the desired speed ranges.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or correspondding parts throughout the several views, and wherein.

DETAILED DESCRIPTION OF THE PREFERRED EMBODIMENTS

Figure 10:
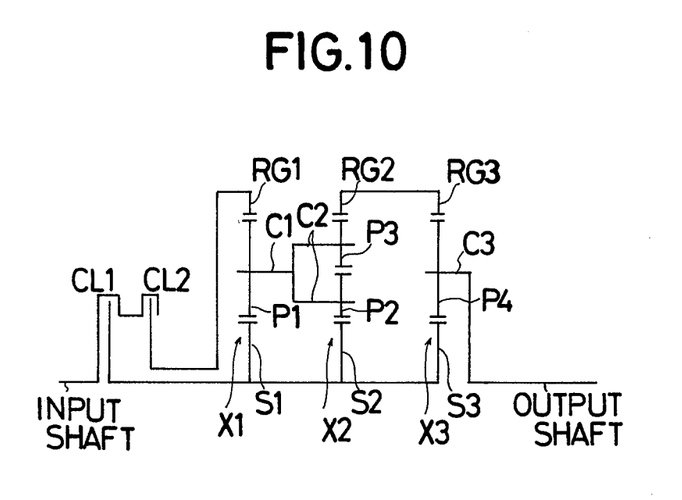
FIG. 10 is a diagram of a gear mechanism including a pair of clutches used in the present invention.

Referring now to the drawings, and more particularly to FIG. 10 thereof, there is shown a gear mechanism which is applicable to the speed change gear system of the present invention.

The gear mechanism comprises a first planetary gear set $X_1$ of the single pinion type, a second planetary gear set $X_2$ of the double pinion type, and a third planetary glar set $X_3$ of the single pinion type, interposed between an input shaft and an output shaft. The first planetary gear set $X_1$ includes a first sun gear $S_1$, a plurality of first pinion gears $P_1$ engaged with the first sun gear $S_1$, a first ring gear $RG_1$ interengaged with the first pinion gears $P_1$, and a first carrier $C_1$ rotatably supporting the first pinion gears $P_1$. The second planetary gear sets $X_2$ includes a second sun gear $S_2$, a plurality of second pinion gears $P_2$ engaged with the second sum gear $S_2$, a plurality of third pinion gears $P_3$ engaged with the second pinion gears $P_2$, a second ring gear $RG_2$ interengaged with the third pinion gears $P_3$, and a second carrier $C_2$ rotatably supporting the second and third pinion gears $P_2$ and $P_3$. The third planetary gear set $X_3$ includes a third sun gear $S_3$, a plurality of fourth pinion gears $P_4$ engaged with the third sun gear $S_3$, a third ring gear $RG_3$ interengaged with the fourth pinion gears $P_4$, and a third carrier $C_3$ rotatably supporting the fourth pinion gears $P_4$. The first and second carriers $C_1$ and $C_2$ are drivingly connected with each other. The first, second, and third sun gears $S_1$, $S_2$ and $S_3$ are drivingly connected with one another. Similarly, the second and third ring gears $RG_2$ and $RG_3$ are drivingly connected with each other. The third carrier $C_3$ is integrally connected to the output shaft. Between the input shaft and the three sun gears $S_1$, $S_2$ and $S_3$ is interposed a first clutch $CL_1$ which serves to couple or uncouple the input shaft with the sun gears $S_1$, $S_2$ $S_3$. Similarly, a second clutch $CL_2$ is interposed between the input shaft and the first ring gear $RG_1$ for coupling or uncoupling the input shaft with the ring gear $RG_1$.

The gear mechanism as illustrated in FIG. 10 is utilized in the speed change gear system of the vehicle by adapting a plurality of brake means which retrain some elements of the three planetary gear sets $X_1$, $X_2$ and $X_3$ from rotation and or a further planetary gear set so that the speed change gear system may have at least four forward drive speed ratios and at least one reverse drive speed ratio satisfying six requirements described in the Prior Art Description of this specification.

Figure 1:
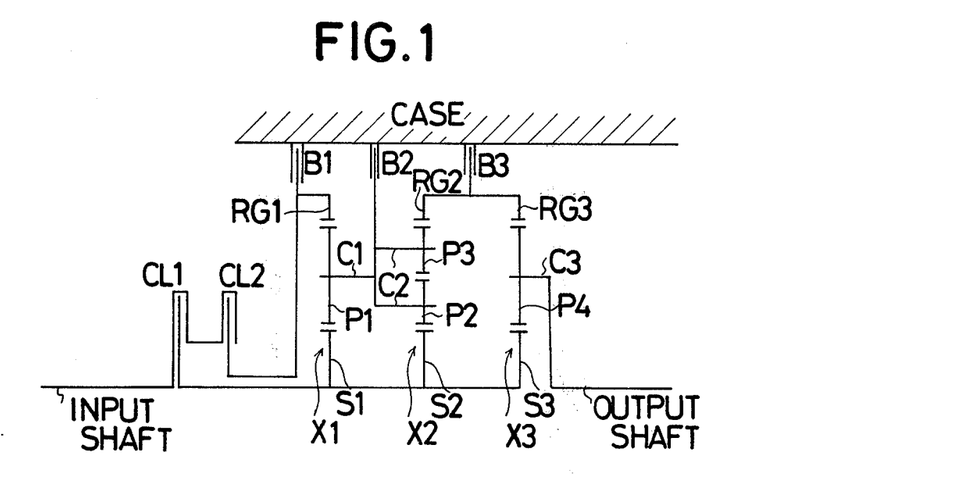
FIG. 1 is a schematic diagram of a first embodiment of a speed change gear system, constructed according to the present invention, and showing its cooperative parts.

Referring next to FIG. 1, there is shown a speed change gear system employing the gear mechanism shown in FIG. 1. In this embodiment, the speed change gear system disposed within a case (a transmission housing) comprises three brake means in addition to the elements of the gear mechanism of FIG. 1. A first brake $B_1$ is secured to the case and is disposed between the case and the first ring gear $RG_1$ so as to be capable of locking the latter to the case when the brake $B_1$ is actuated. A second brake $B_2$ is also secured to the case and is disposed between the case and the first and second carriers $C_1$ and $C_2$ so as to be capable of locking the carriers $C_1$ and $C_2$ to the case when the brake $B_2$ is actuated. Similarly, a third brake $B_3$ is secured to the case and is disposed between the case and the second and third ring gears $RG_2$ and $RG_3$ so as to be capable of locking the ring gears $RG_2$ and $RG_3$ to the case when the brake $B_3$ is actuated.

The following equations are given for the planetary gear sets $X_1$, $X_2$ and $X_3$ and the same hold true throughout all of the other embodiments as will be described hereinafter in greater detail:

$$N_{RG_1} - (1 + I_1) N_{C_1} + I_1 N_{S_1} = 0$$

$$N_{RG_2} - (1 + I_2) N_{C_2} + I_2 N_{S_2} = 0$$

$$N_{RG_3} - (1 + I_3) N_{B_3} + I_3 N_{S_3} = 0$$

wherein:

$N_{RG_1}$, $N_{RG_2}$, $N_{RG_3}$ = the number of revolutions of the first, second and third ring gears;

$N_{C_1}$, $N_{C_2}$, $N_{C_3}$ = the number of revolutions of the first, second and third carriers;

$N_{S_1}$, $N_{S_2}$, $N_{S_3}$ = the number of revolutions of the first, second and third sun gears;

and $I_1$, $I_2$, $I_3$ = the radial ratios of each ring gear relative to each sun gear.

Within this embodiment, and all embodiments of the present invention, the radial ratios within each speed range are assumed to have the specific values of $I_1$, $I_2$ and $I_3$ being 0.452, 0.320 and 0.355, respectively.

Table 1 shows the relationship between the reduction gear ratios of the various speed ranges in this embodiment as a result of the selective operation of clutches $CL_1$, $CL_2$ and brakes $B_1$ through $B_3$ wherein $Fn$ ($n=1,2,3$) designates a forward drive speed range such as for example, $F_1$ designates a first forward speed range, and $Rn$ ($n=1,2$) designates a reverse drive speed range. It is noted that a reduction gear ratio of 1:1.00 can be obtained by employing both of clutches $CL_1$ and $CL_2$ and this is true within all embodiments of the present invention.

Table 1A shows the relationship between the number of revolutions and the tangential forces characteristic of the various elements of the planetary gear sets within each speed range. The ratio of the number of revolutions is based upon the assumption that the number of revolutions of the input shaft is 1, while the values of the tangential forces are based upon the assumption that the value of the input shaft torque exerted upon the ring gear is 1, and the tangential forces of the pinion gears of equal to those of the sun gears and ring gears. Within the Table 1A, A designates a particular speed range, B designates a particular element of the planetary gear sets, N designates the number of revolutions of the elements within the particular speed range, and W designates the tangential force of the particular element, such designations being the same throughout all the embodiments of the invention.

As the reduction gear ratio of the fourth forward drive speed range F is 1:1.00, is the number of revolutions N of each sun gear, ring gear and carrier is 1.00 and the number of revolutions N of each pinion gear is 0.00. The tangential forces W thereof are therefore considerably less than those produced within the other speed ranges, wherein the torque of the input shaft is transmitted to all of the gear set elements through only a single engaged clutch. To the contrary, however, the torque of the input shaft characteristic of the fourth forward drive speed F is transmitted and distributed to all of the gear set elements as a result of the engagement of at least two clutches, and accordingly, it is clear that the tangential forces generated and impressed upon such elements are smaller than those transmitted by means of the input shaft as a result of coupling only one clutch. Hereinafter, therefore, the number of revolutions N and the tangential forces W within the particular speed range having a reduction gear ratio of 1:1.00 will be omitted.

Table 1

| | CL1 | CL2 | B1 | B2 | B3 | GEAR RATIO |
|---|---|---|---|---|---|---|
| F1 | O | | | | O | 3.82 |
| F2 | O | | | O | | 2.01 |
| F3 | O | | O | | | 1.53 |
| F4 | O | O | | | | 1.00 |
| R1 | | O | | | O | −4.33 |
| R2 | | O | | O | | −0.91 |

Table 1 A

| | B | X 1 | | | | X 2 | | | | X 3 | | | |
|---|---|---|---|---|---|---|---|---|---|---|---|---|---|
| A | | S 1 | C 1 | R G 1 | P 1 | S 2 | C 2 | R G 2 | P 2 | P 3 | S 3 | C 3 | R G 3 | P 4 |
| F 1 | N | 1.00 | −0.47 | −1.14 | −2.43 | 1.00 | −0.47 | 0.0 | −1.45 | 1.45 | 1.00 | 0.26 | 0.0 | −0.81 |
| | W | 0.0 | 0.0 | 0.0 | 0.0 | 0.0 | 0.0 | 0.0 | 0.0 | 0.0 | 2.82 | 5.63 | 2.82 | 2.82 |
| F 2 | N | 1.00 | 0.00 | −0.45 | −1.65 | 1.00 | 0.00 | 0.32 | −0.99 | 0.99 | 1.00 | 0.50 | 0.32 | −0.55 |
| | W | 0.00 | 0.0 | 0.0 | 0.0 | 1.48 | 2.96 | 1.48 | 1.48 | 1.48 | 1.48 | 2.96 | 1.48 | 1.48 |
| F 3 | N | 1.00 | 0.31 | 0.0 | −1.14 | 1.00 | 0.31 | 0.53 | −0.68 | 0.68 | 1.00 | 0.65 | 0.53 | −0.38 |

Table 1 A-continued

| A | B | X 1 | | | | X 2 | | | | X 3 | | | |
|---|---|---|---|---|---|---|---|---|---|---|---|---|---|
|   |   | S1 | C1 | RG1 | P1 | S2 | C2 | RG2 | P2 | P3 | S3 | C3 | RG3 | P4 |
| R 1 | W | 0.53 | 1.06 | 0.53 | 0.53 | 1.13 | 2.26 | 1.13 | 1.13 | 1.13 | 1.13 | 2.26 | 1.13 | 1.13 |
|     | N | −0.88 | 0.41 | 1.00 | 2.14 | −0.88 | 0.41 | 0.0 | 1.28 | −1.28 | −0.88 | −0.23 | 0.0 | 0.72 |
|     | W | 1.00 | 2.00 | 1.00 | 1.00 | 2.14 | 4.27 | 2.14 | 2.14 | 2.14 | 2.14 | 3.20 | 6.40 | 3.20 | 3.20 |
| R 2 | N | −2.21 | 0.00 | 1.00 | 3.65 | −2.21 | 0.00 | −0.71 | 2.18 | −2.18 | −2.21 | −1.10 | −0.71 | 1.22 |
|     | W | 1.00 | 2.00 | 1.00 | 1.00 | 0.67 | 1.34 | 0.67 | 0.67 | 0.67 | 0.67 | 1.34 | 0.67 | 0.67 |

Figure 2:
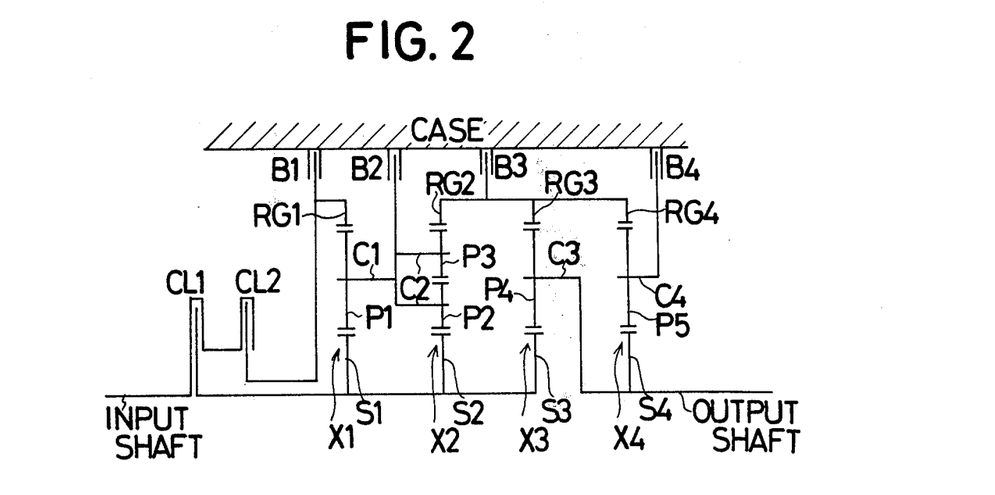
FIG. 2 is a diagram similar to that of FIG. 1 showing however a second embodiment of the present invention.

Referring now to the next embodiment illustrated in FIG. 2 wherein a fourth planetary gear set generally indicated by the reference character $X_4$ of the single pinion type is interposed between the third planetary gear set $X_3$ and the output shaft with respect to the first embodiment of FIG. 1 and is seen to include a fourth sun gear $S_4$, a plurality of fifth pinion gears $P_5$ engaged with the fourth sun gear $S_4$, a fourth ring gear $RG_4$ engaged with the fifth pinion gears $P_5$, and a fourth carrier $C_4$ rotatably supporting the fifth pinions gears $P_5$. The fourth ring gear $RG_4$ is drivingly connected with the second and third ring gears $RG_2$ and $RG_3$, and the fourth ring gear $RG_4$ is locked to the case, as well as the second and third gears $RG_2$ and $RG_3$, when the third brake $B_3$ is actuated. A fourth brake $B_4$ is secured to the case and is disposed between the case and the fourth carrier $C_4$ so as to be capable of locking the carrier $C_4$ to the case when the brake $B_4$ is actuated. The fourth sun gear $S_4$ is drivingly connected with the third carrier $C_3$ as well as with the output shaft.

The following formula is given for the fourth planetary gear set $X_4$:

$$NRG_4 - (1 + I_4) NC_4 + I_4 NS_4 = 0$$

wherein:

$NRG_4 =$ the number of revolutions of the fourth ring gear;

$NC_4 =$ the number of revolutions of the fourth carrier;

$NS_4 =$ the number of revolutions of the fourth sun gear; and $I_4 =$ the radial ratio of the fourth ring gear relative to the fourth sun gear.

Within this embodiment, the radial within each speed range is assumed to be $I_4 = 0.562$, and Table 2 shows the relationship between the reduction gear ratios within each speed range as a result of the selective operation of the clutches $CL_1$ and $CL_2$ and the brakes $B_1$ through $B_4$, while Table 2A shows the relationship between the number of revolutions and the tangential forces characteristic of the elements of the planetary gear sets within each speed range.

Table 2

|    | CL1 | CL2 | B1 | B2 | B3 | B4 | GEAR RATIO |
|----|-----|-----|----|----|----|----|------------|
| F1 | O |   |   |   |   | O | 5.40 |
| F2 | O |   |   |   | O |   | 3.82 |
| F3 | O |   |   | O |   |   | 2.01 |
| F4 | O |   | O |   |   |   | 1.53 |
| F5 | O | O |   |   |   |   | 1.00 |
| R1 |   | O |   |   |   | O | −7.33 |
| R2 |   | O |   |   | O |   | −4.33 |
| R3 |   | O |   | O |   |   | −0.91 |

Table 2A

| A | B | X 1 | | | | X 2 | | | | |
|---|---|-----|----|----|----|----|----|----|----|----|
|   |   | S1 | C1 | RG1 | P1 | S2 | C2 | RG2 | P2 | P3 |
| F 1 | N | 1.00 | −0.62 | −1.36 | −2.68 | 1.00 | −0.62 | −0.10 | −1.60 | 1.60 |
|     | W | 0.00 | 0.00 | 0.00 | 0.00 | 0.00 | 0.00 | 0.00 | 0.00 | 0.00 |
| F 2 | N | 1.00 | −0.47 | −1.14 | −2.43 | 1.00 | −0.47 | 0.0 | −1.45 | 1.45 |
|     | W | 0.0 | 0.0 | 0.0 | 0.0 | 0.0 | 0.0 | 0.0 | 0.0 | 0.0 |
| F 3 | N | 1.00 | 0.00 | −0.45 | −1.65 | 1.00 | 0.00 | 0.32 | −0.99 | 0.99 |
|     | W | 0.00 | 0.0 | 0.0 | 0.0 | 1.48 | 2.96 | 1.48 | 1.48 | 1.48 |
| F 4 | N | 1.00 | 0.31 | 0.0 | −1.14 | 1.00 | 0.31 | 0.53 | −0.68 | 0.68 |
|     | W | 0.53 | 1.06 | 0.53 | 0.53 | 1.13 | 2.26 | 1.13 | 1.13 | 1.13 |
| R 1 | N | −0.74 | 0.46 | 1.00 | 1.97 | −0.74 | 0.46 | 0.08 | 1.18 | −1.18 |
|     | W | 1.00 | 2.00 | 1.00 | 1.00 | 2.14 | 4.27 | 2.14 | 2.14 | 2.14 |
| R 2 | N | −0.88 | 0.41 | 1.00 | 2.14 | −0.88 | 0.41 | 0.00 | 1.28 | −1.28 |
|     | W | 1.00 | 2.00 | 1.00 | 1.00 | 2.14 | 4.27 | 2.14 | 2.14 | 2.14 |
| R 3 | N | −2.21 | 0.00 | 1.00 | 3.65 | −2.21 | 0.00 | −0.71 | 2.18 | −2.18 |
|     | W | 1.00 | 2.00 | 1.00 | 1.00 | 0.67 | 1.34 | 0.67 | 0.67 | 0.67 |

| A | B | X 3 | | | | X 4 | | | |
|---|---|-----|----|----|----|----|----|----|----|
|   |   | S3 | C3 | RG3 | P4 | S4 | C4 | RG4 | P5 |
| F 1 | N | 1.00 | 0.19 | −0.10 | −0.90 | 0.19 | 0.00 | −0.10 | −0.48 |
|     | W | 2.82 | 5.63 | 2.82 | 2.82 | 2.82 | 5.63 | 2.82 | 2.82 |
| F 2 | N | 1.00 | 0.26 | 0.0 | −0.81 | 0.26 | 0.09 | 0.0 | −0.43 |
|     | W | 2.82 | 5.63 | 2.82 | 2.82 | 0.0 | 0.0 | 0.0 | 0.0 |
| F 3 | N | 1.00 | 0.50 | 0.32 | −0.55 | 0.50 | 0.38 | 0.32 | −0.29 |
|     | W | 1.48 | 2.96 | 1.48 | 1.48 | 0.0 | 0.0 | 0.0 | 0.0 |
| F 4 | N | 1.00 | 0.65 | 0.53 | −0.38 | 0.65 | 0.58 | 0.53 | −0.20 |
|     | W | 1.13 | 2.26 | 1.13 | 1.13 | 0.0 | 0.0 | 0.0 | 0.0 |
| R 1 | N | −0.74 | −0.14 | 0.08 | 0.66 | −0.14 | 0.00 | 0.08 | 0.35 |
|     | W | 3.20 | 6.40 | 3.20 | 3.20 | 5.33 | 10.67 | 5.33 | 5.33 |
| R 2 | N | −0.88 | −0.23 | 0.00 | 0.72 | −0.23 | −0.08 | 0.00 | 0.38 |
|     | W | 3.20 | 6.40 | 3.20 | 3.20 | 0.0 | 0.0 | 0.0 | 0.0 |
| R 3 | N | −2.21 | −1.10 | −0.71 | 1.22 | −1.10 | −0.85 | −0.71 | 0.65 |
|     | W | 0.67 | 1.34 | 0.67 | 0.67 | 0.0 | 0.0 | 0.0 | 0.0 |

Figure 3:
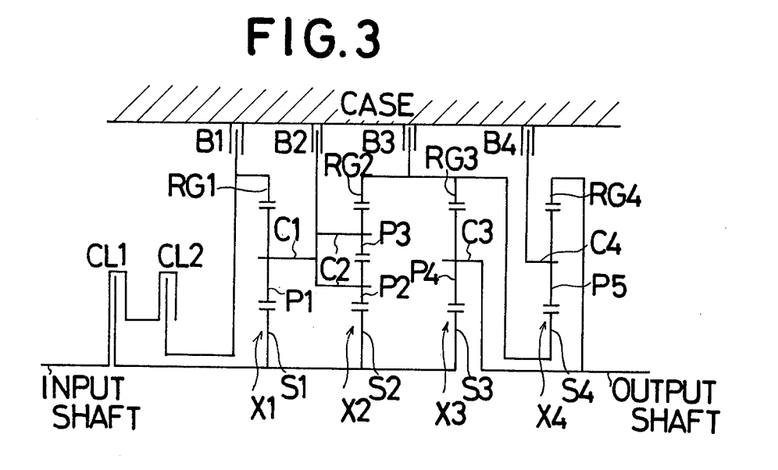
FIG. 3 is a diagram also similar to that of FIG. 1 showing a third embodiment of the present invention.

Referring now to FIG. 3, wherein the fourth planetary gear set $X_4$ of the single pinion type is interposed between the third planetary gear set $X_3$ and the output shaft as is similar to the previous embodiment of FIG. 2, however, the fourth planetary gear set $X_4$ includes a fourth sun gear $S_4$ drivingly connected with the second and third gears $RG_2$ and $RG_3$, and is capable of being locked to the case together with the same when the third brake $B_3$ is actuated. A fourth brake $B_4$ is secured to the case and is disposed between the case and the fourth carrier $C_4$ so as to be capable of locking the fourth carrier $C_4$ relative thereto when brake $B_4$ is actuated.

Within this embodiment, the radial ratio within the speed changes is assumed to be $I_4 = 0.562$ and Table 3 shows the relationship between the reduction gear ratios within each speed range as a result of the operation of the clutches and brakes while Table 3A shows the relationship between the number of revolutions and the tangential forces characteristic of the elements of the planetary gear sets within each speed range.

Figure 4:
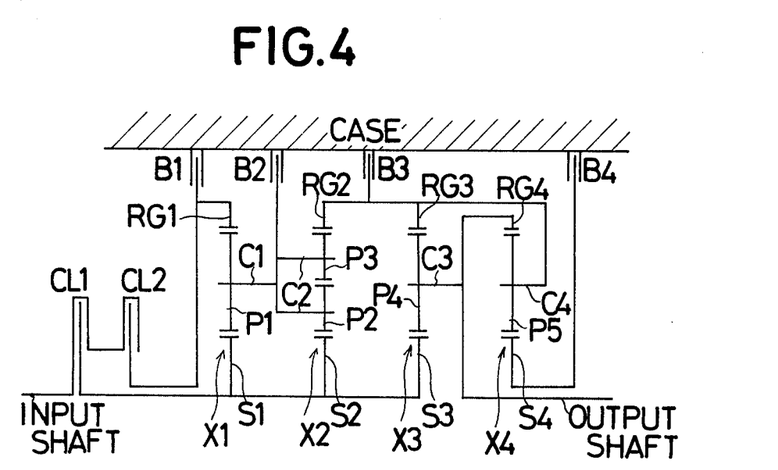
FIG. 4 is a diagram similar to FIG. 1 showing a fourth embodiment of the present invention.

With reference now being made to FIG. 4, the embodiment disposes the fourth planetary gear set $X_4$ of the single pinion type between the third planetary gear set $X_3$ and the output shaft in such a manner that the fourth carrier $C_4$ is drivingly connected with the second and third ring gears $RG_2$ and $RG_3$, the entire assembly being capable of being locked relative to the case when the third brake $B_3$ is actuated. The fourth brake $B_4$ is secured to the case and is disposed between the case and the fourth sun gear $S_4$ so as to capable of locking the fourth sun gear $S_4$ relative thereto when the brake $B_4$ is actuated, and it is also noted that the fourth ring gear $RG_4$ is drivingly connected with the third carrier $C_3$ as well as with the output shaft.

Within this embodiment, the radial ratio within each speed range is $I_4 = 0.355$, and Table 4 shows the relationship between the gear ratios and speed ranges as a result of the selective operation of the clutches and the brakes while Table 4A shows the relationship between the number of revolutions and the tangential forces characteristic of all the elements of the planetary gear sets within each speed range.

Table 3

|    | CL 1 | CL 2 | B 1 | B 2 | B 3 | B 4 | GEAR RATIO |
|----|------|------|-----|-----|-----|-----|------------|
| F1 | O    |      |     |     |     | O   | 8.83       |
| F2 | O    |      |     |     | O   |     | 3.82       |
| F3 | O    |      |     | O   |     |     | 2.01       |
| F4 | O    |      | O   |     |     |     | 1.53       |
| F5 | O    | O    |     |     |     |     | 1.00       |
| R1 |      | O    |     |     |     | O   | −13.82     |
| R2 |      | O    |     |     | O   |     | −4.33      |
| R3 |      | O    |     | O   |     |     | −0.91      |

Table 4

|    | CL1 | CL2 | B1 | B2 | B3 | B4 | GEAR RATIO |
|----|-----|-----|----|----|----|----|------------|
| F1 | O   |     |    |    | O  |    | 3.82       |
| F2 | O   |     |    | O  |    |    | 2.01       |
| F3 | O   |     |    |    |    | O  | 1.74       |
| F4 | O   |     |    | O  |    |    | 1.53       |
| F5 | O   | O   |    |    |    |    | 1.00       |
| R1 |     | O   |    |    | O  |    | −4.33      |
| R2 |     | O   |    | O  |    |    | −0.91      |
| R3 |     | O   |    |    |    | O  | −0.40      |

Table 3 A

| B | | X1 | | | | X2 | | | |
|---|---|------|------|------|------|------|------|------|------|
| A |   | S1   | C1   | RG1  | P1   | S2   | C2   | RG2  | P2   | P3 |
| F1 | N | 1.00 | −0.77 | −1.57 | −2.91 | 1.00 | −0.77 | −0.20 | −1.74 | 1.74 |
|    | W | 0.00 | 0.00 | 0.00 | 0.00 | 0.00 | 0.00 | 0.00 | 0.00 | 0.00 |
| F2 | N | 1.00 | −0.47 | −1.14 | −2.43 | 1.00 | −0.47 | 0.0  | −1.45 | 1.45 |
|    | W | 0.0  | 0.0  | 0.0  | 0.0  | 0.0  | 0.0  | 0.0  | 0.0  | 0.0  |
| F3 | N | 1.00 | 0.00 | −0.45 | −1.65 | 1.00 | 0.00 | 0.32 | −0.99 | 0.99 |
|    | W | 0.00 | 0.0  | 0.0  | 0.0  | 0.0  | 1.48 | 2.96 | 1.48 | 1.48 |
| F4 | N | 1.00 | 0.31 | 0.0  | −1.14 | 1.00 | 0.31 | 0.53 | −0.68 | 0.68 |
|    | W | 0.53 | 1.06 | 0.53 | 0.53 | 1.13 | 2.26 | 1.13 | 1.13 | 1.13 |
| R1 | N | −0.64 | 0.49 | 1.00 | 1.86 | −0.64 | 0.49 | 0.13 | 1.11 | −1.11 |
|    | W | 1.00 | 2.00 | 1.00 | 1.00 | 2.14 | 4.27 | 2.14 | 2.14 | 2.14 |
| R2 | N | −0.88 | 0.41 | 1.00 | 2.14 | −0.88 | 0.41 | 0.00 | 1.28 | −1.28 |
|    | W | 1.00 | 2.00 | 1.00 | 1.00 | 2.14 | 4.27 | 2.14 | 2.14 | 2.14 |
| R3 | N | −2.21 | 0.00 | 1.00 | 3.65 | −2.21 | 0.00 | −0.71 | 2.18 | −2.18 |
|    | W | 1.00 | 2.00 | 1.00 | 1.00 | 0.67 | 1.34 | 0.67 | 0.67 | 0.67 |

| B | | X3 | | | | X4 | | | |
|---|---|------|------|------|------|------|------|------|------|
| A |   | S3   | C3   | RG3  | P4   | S4   | C4   | RG4  | P5   |
| F1 | N | 1.00 | 0.11 | −0.20 | −0.98 | −0.20 | −0.00 | 0.11 | 0.52 |
|    | W | 2.82 | 5.63 | 2.82 | 2.82 | 5.01 | 10.02 | 5.01 | 5.01 |
| F2 | N | 1.00 | 0.26 | 0.0  | −0.81 | 0.0  | 0.17 | 0.26 | 0.43 |
|    | W | 2.82 | 5.63 | 2.82 | 2.82 | 0.0  | 0.0  | 0.0  | 0.0  |
| F3 | N | 1.00 | 0.50 | 0.32 | −0.55 | 0.32 | 0.43 | 0.50 | 0.29 |
|    | W | 1.48 | 2.96 | 1.48 | 1.48 | 0.0  | 0.0  | 0.0  | 0.0  |
| F4 | N | 1.00 | 0.65 | 0.53 | −0.38 | 0.53 | 0.61 | 0.65 | 0.20 |
|    | W | 1.13 | 2.26 | 1.13 | 1.13 | 0.0  | 0.0  | 0.0  | 0.0  |
| R1 | N | −0.64 | −0.07 | 0.13 | 0.62 | 0.13 | 0.00 | −0.07 | −0.33 |
|    | W | 3.20 | 6.40 | 3.20 | 3.20 | 9.49 | 18.98 | 9.49 | 9.49 |
| R2 | N | −0.88 | −0.23 | 0.00 | 0.72 | 0.00 | −0.15 | −0.23 | −0.38 |
|    | W | 3.20 | 6.40 | 3.20 | 3.20 | 0.0  | 0.0  | 0.0  | 0.0  |
| R3 | N | −2.21 | −1.10 | −0.71 | 1.22 | −0.71 | −0.96 | −1.10 | −0.65 |
|    | W | 0.67 | 1.34 | 0.67 | 0.67 | 0.0  | 0.0  | 0.0  | 0.0  |

Table 4

| B | | X1 | | | | X2 | | | |
|---|---|------|------|------|------|------|------|------|------|
| A |   | S1   | C1   | RG1  | P1   | S2   | C2   | RG2  | P2   | P3 |
| F1 | N | 1.00 | −0.47 | −1.14 | −2.43 | 1.00 | −0.47 | 0.0 | −1.45 | 1.45 |

Table 4-continued

|   | B |  | X1 |  |  | X2 |  |  |  |
|---|---|---|---|---|---|---|---|---|---|
| A |   | S1 | C1 | RG1 | P1 | S2 | C2 | RG2 | P2 |
| F2 | N | 1.00 | 0.00 | −0.45 | −1.65 | 1.00 | 0.00 | 0.32 | −0.99 | 0.99 |
|   | W | 0.00 | 0.0 | 0.0 | 0.0 | 1.48 | 2.96 | 1.48 | 1.48 | 1.48 |
| F3 | N | 1.00 | 0.15 | −0.23 | −1.40 | 1.00 | 0.15 | 0.42 | −0.83 | 0.83 |
|   | W | 0.0 | 0.0 | 0.0 | 0.0 | 0.0 | 0.0 | 0.0 | 0.0 | 0.0 |
| F4 | N | 1.00 | 0.31 | 0.0 | −1.14 | 1.00 | 0.31 | 0.53 | −0.68 | 0.68 |
|   | W | 0.53 | 1.06 | 0.53 | 0.53 | 1.13 | 2.26 | 1.13 | 1.13 | 1.13 |
| R1 | N | −0.88 | 0.41 | 1.00 | 2.14 | −0.88 | 0.41 | 0.00 | 1.28 | −1.28 |
|   | W | 1.00 | 2.00 | 1.00 | 1.00 | 2.14 | 4.27 | 2.14 | 2.14 | 2.14 |
| R2 | N | −2.21 | 0.00 | 1.00 | 3.65 | −2.21 | 0.00 | −0.71 | 2.18 | −2.18 |
|   | W | 1.00 | 2.00 | 1.00 | 1.00 | 0.67 | 1.34 | 0.67 | 0.67 | 0.67 |

|   | B |  | X3 |  |  | X4 |  |  |  |
|---|---|---|---|---|---|---|---|---|---|
| A |   | S3 | C3 | RG3 | P4 | S4 | C4 | RG4 | P5 |
| F1 | N | 1.00 | 0.26 | 0.0 | −0.81 | −0.74 | 0.0 | 0.26 | 0.81 |
|   | W | 2.82 | 5.63 | 2.82 | 2.82 | 0.0 | 0.0 | 0.0 | 0.0 |
| F2 | N | 1.00 | 0.50 | 0.32 | −0.55 | −0.18 | 0.32 | 0.50 | 0.55 |
|   | W | 1.48 | 2.96 | 1.48 | 1.48 | 0.0 | 0.0 | 0.0 | 0.0 |
| F3 | N | 1.00 | 0.58 | 0.42 | −0.47 | 0.0 | 0.42 | 0.58 | 0.47 |
|   | W | 2.82 | 5.63 | 2.82 | 2.82 | 2.08 | 4.16 | 2.08 | 2.08 |
| F4 | N | 1.00 | 0.65 | 0.53 | −0.38 | 0.19 | 0.53 | 0.65 | 0.38 |
|   | W | 1.13 | 2.26 | 1.13 | 1.13 | 0.0 | 0.0 | 0.0 | 0.0 |
| R1 | N | −0.88 | −0.23 | 0.00 | 0.72 | 0.65 | 0.00 | −0.23 | −0.72 |
|   | W | 3.20 | 6.40 | 3.20 | 3.20 | 0.0 | 0.0 | 0.0 | 0.0 |
| R2 | N | −2.21 | −1.10 | −0.71 | 1.22 | 0.40 | −0.71 | −1.10 | −1.22 |
|   | W | 0.67 | 1.34 | 0.67 | 0.67 | 0.00 | 0.0 | 0.0 | 0.0 |

Figure 4A:
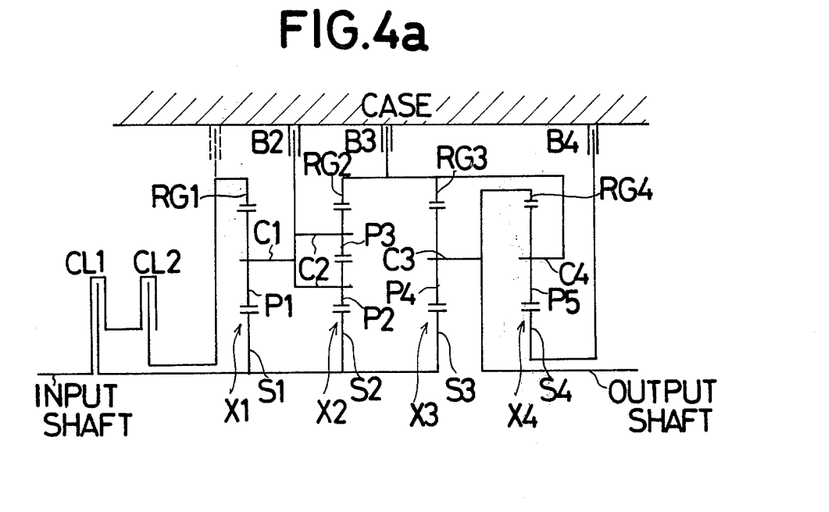
FIG. 4a is a diagram similar to FIG. 4 showing however a first brake $B_1$ being omitted therefrom.

It should be noted in FIG. 4 and Table 4 that one or more of the brakes $B_1$, $B_2$, $B_3$ and $B_4$ may be omitted to obtain four or more stages of forward drive and one or more stages of reverse drive. For example, when the first brake $B_1$ is omitted as is shown in FIG. 4a, the fourth forward drive speed $F_4$ and the gear ratio thereof are also omitted from Table 4. In this case, however, the four forward drive speed ranges $F_1$, $F_2$, $F_3$ and $F_5$ and three reverse drive speed ranges $R_1$, $R_2$ and $R_3$ may still be obtained.

Figure 5:
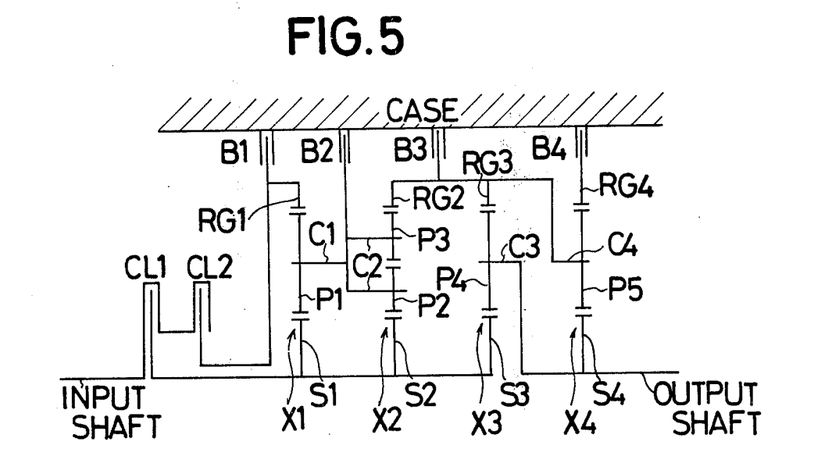
FIG. 5 is a diagram similar to FIG. 1 showing a fifth embodiment of the present invention.

A fifth embodiment of the system is illustrated within FIG. 5, and it is seen that the fourth planetary gear set $X_4$ of the single pinion type is interposed between the third planetary gear set $X_3$ and the output shaft wherein the forth carrier $C_4$ is drivingly connected with the second and third ring gears $RG_2$, $RG_3$, and these three elements are capable of being locked relative to the case when the third brake $B_3$ is actuated. A fourth brake $B_4$ is secured to the case and is disposed between the case and the fourth ring gear $RG_4$ so as to be capable of locking the latter to the case when the brake $B_4$ is actuated, and the fourth sun gear $S_4$ is drivingly connected with the third carrier $C_3$ as well as with the output shaft.

Within this embodiment, the radial ratio within the speed ranges is $I_4 = 0.562$, and Table 5 shows the relationship between the gear ratios and the speed ranges as a result of the selective operation of the clutches and brakes and Table 5A shows a relationship between the number of revolutions and the tangential forces characteristic of the elements within the planetary gear sets within each speed range.

Table 5

|   | CL1 | CL2 | B1 | B2 | B3 | B4 | GEAR RATIO |
|---|---|---|---|---|---|---|---|
| F1 | O |   |   |   |   | O | 3.82 |
| F2 | O |   |   |   | O |   | 2.80 |
| F3 | O |   |   | O |   |   | 2.01 |
| F4 | O |   | O |   |   |   | 1.53 |
| F5 | O | O |   |   |   |   | 1.00 |
| R1 |   | O |   |   |   | O | −4.33 |
| R2 |   | O |   |   | O |   | −2.41 |
| R3 |   | O |   | O |   |   | −0.91 |

Table 5

|   | B |  | X1 |  |  | X2 |  |  |  |
|---|---|---|---|---|---|---|---|---|---|
| A |   | S1 | C1 | RG1 | P1 | S2 | C2 | RG2 | P2 | P3 |
| F1 | N | 1.00 | −0.47 | −1.14 | −2.43 | 1.00 | −0.47 | 0.0 | −1.45 | 1.45 |
|   | W | 0.0 | 0.0 | 0.0 | 0.0 | 0.0 | 0.0 | 0.0 | 0.0 | 0.0 |
| F2 | N | 1.00 | −0.28 | −0.86 | −2.11 | 1.00 | −0.28 | 0.13 | −1.26 | 1.26 |
|   | W | 0.0 | 0.0 | 0.0 | 0.0 | 0.0 | 0.0 | 0.0 | 0.0 | 0.0 |
| F3 | N | 1.00 | 0.00 | −0.45 | −1.65 | 1.00 | 0.00 | 0.32 | −0.99 | 0.99 |
|   | W | 0.00 | 0.0 | 0.0 | 0.0 | 1.48 | 2.96 | 1.48 | 1.48 | 1.48 |
| F4 | N | 1.00 | 0.31 | 0.0 | −1.14 | 1.00 | 0.31 | 0.53 | −0.68 | 0.68 |
|   | W | 0.53 | 1.06 | 0.53 | 0.53 | 1.13 | 2.26 | 1.13 | 1.13 | 1.13 |
| R1 | N | −0.88 | 0.41 | 1.00 | 2.14 | −0.88 | 0.41 | 0.00 | 1.28 | −1.28 |
|   | W | 1.00 | 2.00 | 1.00 | 1.00 | 2.14 | 4.27 | 2.14 | 2.14 | 2.14 |
| R2 | N | −1.16 | 0.33 | 1.00 | 2.46 | −1.16 | 0.33 | −0.15 | 1.47 | −1.47 |
|   | W | 1.00 | 2.00 | 1.00 | 1.00 | 2.14 | 4.27 | 2.14 | 2.14 | 2.14 |
| R3 | N | −2.21 | 0.00 | 1.00 | 3.65 | −2.21 | 0.00 | −0.71 | 2.18 | −2.18 |
|   | W | 1.00 | 2.00 | 1.00 | 1.00 | 0.67 | 1.34 | 0.67 | 0.67 | 0.67 |

|   | B |  | X3 |  |  | X4 |  |  |  |
|---|---|---|---|---|---|---|---|---|---|
| A |   | S3 | C3 | RG3 | P4 | S4 | C4 | RG4 | P5 |
| F1 | N | 1.00 | 0.26 | 0.0 | −0.81 | 0.26 | 0.00 | −0.15 | −0.67 |
|   | W | 2.82 | 5.63 | 2.82 | 2.82 | 0.0 | 0.0 | 0.0 | 0.0 |
| F2 | N | 1.00 | 0.36 | 0.13 | −0.71 | 0.36 | 0.13 | 0.0 | −0.59 |
|   | W | 2.82 | 5.63 | 2.82 | 2.82 | 1.80 | 3.61 | 1.80 | 1.80 |
| F3 | N | 1.00 | 0.50 | 0.32 | −0.55 | 0.50 | 0.32 | 0.22 | −0.46 |
|   | W | 1.48 | 2.96 | 1.48 | 1.48 | 0.0 | 0.0 | 0.0 | 0.0 |
| F4 | N | 1.00 | 0.65 | 0.53 | −0.38 | 0.65 | 0.53 | 0.46 | −0.31 |

Table 5-continued

|    |   |       |       |       |       |       |       |       |       |
|----|---|-------|-------|-------|-------|-------|-------|-------|-------|
|    | W | 1.13  | 2.26  | 1.13  | 1.13  | 0.0   | 0.0   | 0.0   | 0.0   |
| R1 | N | −0.88 | −0.23 | 0.00  | 0.72  | −0.23 | 0.0   | 0.13  | 0.59  |
|    | W | 3.20  | 6.40  | 3.20  | 3.20  | 0.0   | 0.0   | 0.0   | 0.0   |
| R2 | N | −1.16 | −0.41 | −0.15 | 0.82  | −0.41 | −0.15 | 0.0   | 0.68  |
|    | W | 3.20  | 6.40  | 3.20  | 3.20  | 3.41  | 6.83  | 3.41  | 3.41  |
| R3 | N | −2.21 | −1.10 | −0.71 | 1.22  | −1.00 | −0.71 | −0.49 | 1.01  |
|    | W | 0.67  | 1.34  | 0.67  | 0.67  | 0.0   | 0.0   | 0.0   | 0.0   |

Figure 5A:
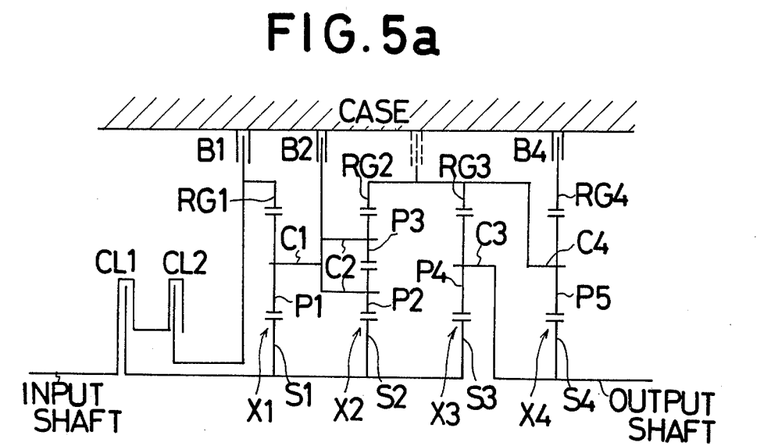
FIG. 5a is a diagram similar to FIG. 5 showing however a third brake $B_3$ being omitted therefrom.
Figure 5B:
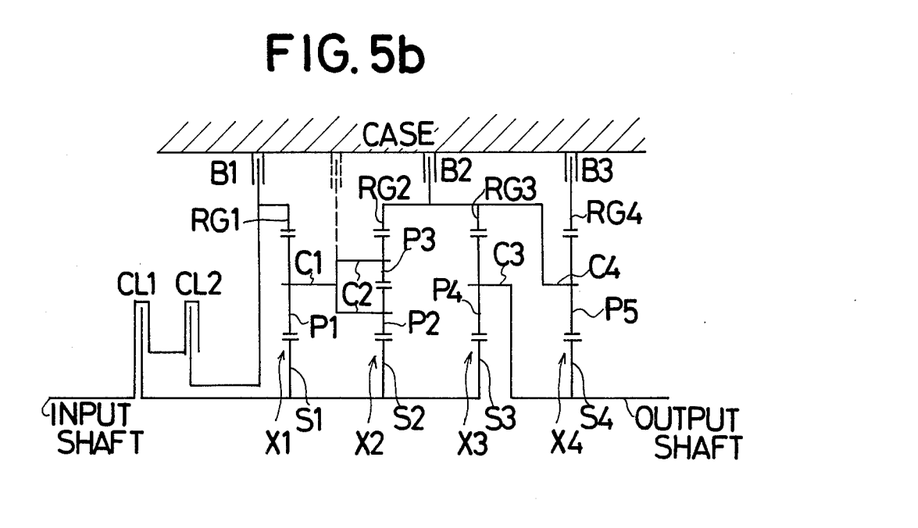
FIG. 5b is a diagram similar to FIG. 5 showing however a second brake $B_2$ being omitted therefrom.

It is also noted within this embodiment that one or more brakes $B_1$ through $B_4$ may be omitted to obtain at least four forward drive speed ranges and at least two reverse drive speed ranges. For example, FIG. 5a shows the speed change gear system omitting the third brake $B_3$ from FIG. 5 while FIG. 5b shows the speed change gear system omitting the second brake $B_2$ from FIG. 5.

Figure 6:
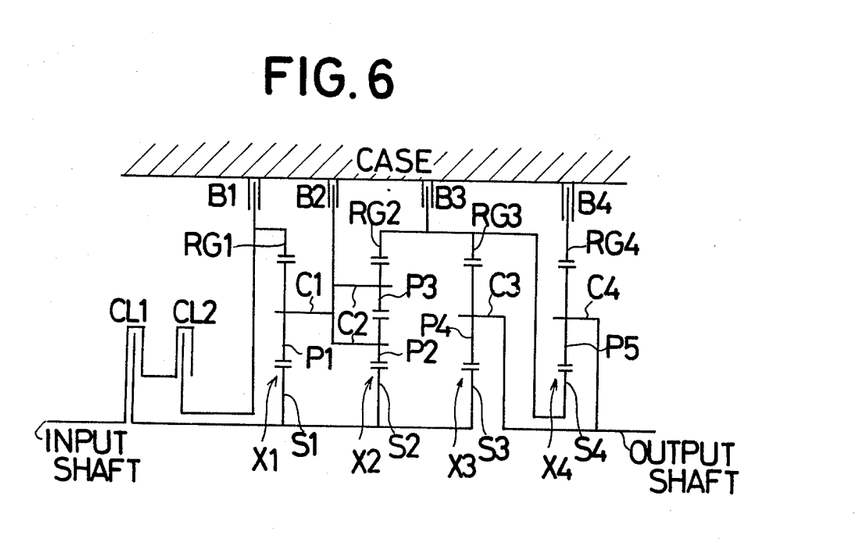
FIG. 6 is a diagram similar to FIG. 1 showing a sixth embodiment of the present invention.

Turning now to the consideration of a sixth embodiment of the present invention which is illustrated within FIG. 6, the fourth planetary gear set $X_4$ of the single pinion type is disposed between the third planetary gear set $X_3$ and the output shaft and it is seen that the fourth sun gear $S_4$ is drivingly connected with the second and third ring gears $RG_2$ and $RG_3$ and the same are capable of being locked relative to the case when the brake $B_3$ is actuated. The fourth brake $B_4$ is secured to the case and is disposed between the case and the fourth ring gear $RG_4$ so as to be capable of locking the latter relative to the case when the brake $B_4$ is actuated, it also being noted that the fourth carrier $C_4$ is drivingly connected with the third carrier $C_3$ as well as with the output shaft.

Within this embodiment, the radial ratio within each speed range is $I_4 = 0.437$ and Table 6 shows the relationship between the gear ratios and the speed ranges as a result of the selective operation of the clutches and brakes and Table 6A shows the relationship between the number of revolutions and the tangential forces characteristic of the elements of the planetary gear sets within each speed range.

Table 6

|    | CL1 | CL2 | B1 | B2 | B3 | B4 | GEAR RATIO |
|----|-----|-----|----|----|----|----|------------|
| F1 |     | O   |    |    |    | O  | 13.20      |
| F2 | O   |     |    |    | O  |    | 3.82       |
| F3 | O   |     |    | O  |    |    | 2.01       |
| F4 | O   |     | O  |    |    |    | 1.53       |
| F5 | O   | O   |    |    |    |    | 1.00       |
| R1 | O   |     |    |    |    | O  | −5.45      |
| R2 |     | O   |    |    | O  |    | −4.33      |
| R3 |     | O   |    | O  |    |    | −0.91      |

Table 6A

| A | B |   | X1 |   |   |   | X2 |   |   |   |
|---|---|---|----|----|----|----|----|----|----|----|
|   |   | S1 | C1 | RG1 | P1 | S2 | C2 | RG2 | P2 | P3 |
| F1 | N | −0.41 | 0.56 | 1.00 | 1.60 | −0.41 | 0.56 | 0.25 | 0.96 | −0.96 |
|    | W | 1.00 | 2.00 | 1.00 | 1.00 | 2.14 | 4.27 | 2.14 | 2.14 | 2.14 |
| F2 | N | 1.00 | −0.47 | −1.14 | −2.43 | 1.00 | −0.47 | 0.0 | −1.45 | 1.45 |
|    | W | 0.0 | 0.0 | 0.0 | 0.0 | 0.0 | 0.0 | 0.0 | 0.0 | 0.0 |
| F3 | N | 1.00 | 0.00 | −0.45 | −1.65 | 1.00 | 0.00 | 0.32 | −0.99 | 0.99 |
|    | W | 0.00 | 0.0 | 0.0 | 0.0 | 1.48 | 2.96 | 1.48 | 1.48 | 1.48 |
| F4 | N | 1.00 | 0.31 | 0.0 | −1.14 | 1.00 | 0.31 | 0.53 | −0.68 | 0.68 |
|    | W | 0.53 | 1.06 | 0.53 | 0.53 | 1.13 | 2.26 | 1.13 | 1.13 | 1.13 |
| R1 | N | 1.00 | −1.36 | −2.42 | −3.89 | 1.00 | −1.36 | −0.60 | −2.33 | 2.33 |
|    | W | 0.0 | 0.0 | 0.0 | 0.0 | 0.0 | 0.0 | 0.0 | 0.0 | 0.0 |
| R2 | N | −0.88 | 0.41 | 1.00 | 2.14 | −0.88 | 0.41 | 0.00 | 1.28 | −1.28 |
|    | W | 1.00 | 2.00 | 1.00 | 1.00 | 2.14 | 4.27 | 2.14 | 2.14 | 2.14 |
| R3 | N | −2.21 | 0.00 | 1.00 | 3.65 | −2.21 | 0.00 | −0.71 | 2.18 | −2.18 |
|    | W | 1.00 | 2.00 | 1.00 | 1.00 | 0.67 | 1.34 | 0.67 | 0.67 | 0.67 |

| A | B |   | X3 |   |   |   | X4 |   |   |
|---|---|---|----|----|----|----|----|----|----|
|   |   | S3 | C3 | RG3 | P4 | S4 | C4 | RG4 | P5 |
| F1 | N | −0.41 | 0.08 | 0.25 | 0.54 | 0.25 | 0.08 | 0.0 | −0.27 |
|    | W | 3.20 | 6.40 | 3.20 | 3.20 | 12.20 | 24.41 | 12.20 | 12.20 |
| F2 | N | 1.00 | 0.26 | 0.0 | −0.81 | 0.0 | 0.26 | 0.38 | 0.41 |
|    | W | 2.82 | 5.63 | 2.82 | 2.82 | 0.0 | 0.0 | 0.0 | 0.0 |
| F3 | N | 1.00 | 0.50 | 0.32 | −0.55 | 0.32 | 0.50 | 0.58 | 0.28 |
|    | W | 1.48 | 2.96 | 1.48 | 1.48 | 0.0 | 0.0 | 0.0 | 0.0 |
| F4 | N | 1.00 | 0.65 | 0.53 | −0.38 | 0.53 | 0.65 | 0.71 | 0.19 |
|    | W | 1.13 | 2.26 | 1.13 | 1.13 | 0.0 | 0.0 | 0.0 | 0.0 |
| R1 | N | 1.00 | −0.18 | −0.60 | −1.30 | −0.60 | −0.18 | 0.0 | 0.65 |
|    | W | 2.82 | 5.63 | 2.82 | 2.82 | 6.45 | 12.89 | 6.45 | 6.45 |
| R2 | N | −0.88 | −0.23 | 0.00 | 0.72 | 0.00 | −0.23 | −0.33 | −0.36 |
|    | W | 3.20 | 6.40 | 3.20 | 3.20 | 0.0 | 0.0 | 0.0 | 0.0 |
| R3 | N | −2.21 | −1.10 | −0.71 | 1.22 | −0.71 | −1.10 | −1.27 | −0.61 |
|    | W | 0.67 | 1.34 | 0.67 | 0.67 | 0.0 | 0.0 | 0.0 | 0.0 |

Figure 7:
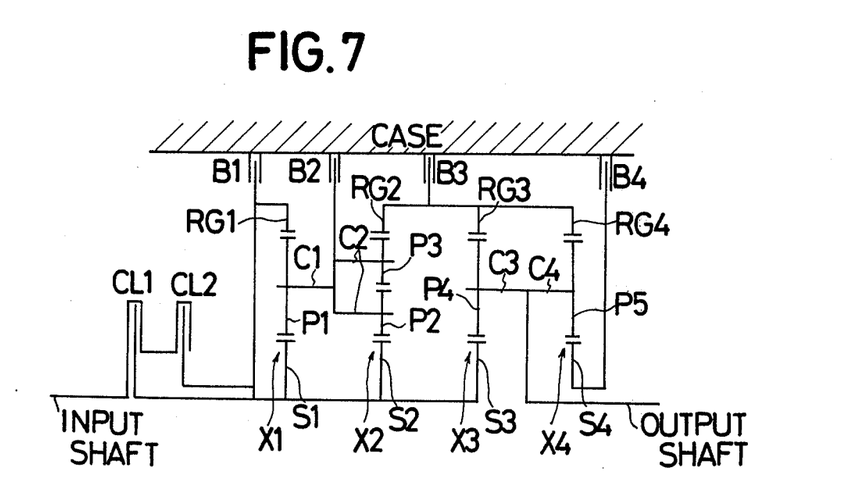
FIG. 7 is a diagram similar to FIG. 1 showing a seventh embodiment of the present invention.

Considering now a seventh embodiment of the present invention in connection with FIG. 7, the fourth planetary gear set $X_4$ of the single pinion type is again interposed between the third planetary set $X_3$ and the output shaft and is seen to include a fourth ring gear $RG_4$ which is drivingly connected with the third sun gear $S_3$ and a fourth carrier $C_4$ which is drivingly connected with the third carrier $C_3$ as well as with the output shaft. A fourth brake $B_4$ is disposed between the fourth sun gear $S_4$ and the case for locking the former relative to the latter when the brake $B_4$ is actuated.

Within this embodiment, the radial ratio within each speed range is $I_4 = 0.562$ and Table 7 shows the relationship between the gear ratios and the speed ranges as a result of the selective operation of the clutches and brakes while Table 7A shows the relationship between the number of revolutions and the tangential forces characteristic of the elements of the planetary gear sets within each speed range.

Table 7

| | CL1 | CL2 | B1 | B2 | B3 | B4 | GEAR RATIO |
|---|---|---|---|---|---|---|---|
| F1 | | | O | | | O | 4.00 |
| F2 | O | | | | O | | 3.82 |
| F3 | O | | | O | | | 2.01 |
| F4 | O | | | O | | | 1.53 |
| F5 | O | O | | | | | 1.00 |
| R1 | | | O | | | O | −4.33 |
| R2 | | | O | | O | | −0.91 |

Table 7A

| A | B | X1 | | | | X2 | | | | |
|---|---|---|---|---|---|---|---|---|---|---|
| | | S1 | C1 | RG1 | P1 | S2 | C2 | RG2 | P2 | P3 |
| F1 | N | −0.15 | 0.64 | 1.00 | 1.30 | −0.15 | 0.64 | 0.39 | 0.78 | −0.78 |
| | W | 1.00 | 2.00 | 1.00 | 1.00 | 2.14 | 4.27 | 2.14 | 2.14 | 2.14 |
| F2 | N | 1.00 | −0.47 | −1.14 | −2.43 | 1.00 | −0.47 | 0.0 | −1.45 | 1.45 |
| | W | 0.0 | 0.0 | 0.0 | 0.0 | 0.0 | 0.0 | 0.0 | 0.0 | 0.0 |
| F3 | N | 1.00 | 0.00 | −0.45 | −1.65 | 1.00 | 0.00 | 0.32 | −0.99 | 0.99 |
| | W | 0.00 | 0.0 | 0.0 | 0.0 | 1.48 | 2.96 | 1.48 | 1.48 | 1.48 |
| F4 | N | 1.00 | 0.31 | 0.0 | −1.14 | 1.00 | 0.31 | 0.53 | −0.68 | 0.68 |
| | W | 0.53 | 1.06 | 0.53 | 0.53 | 1.13 | 2.26 | 1.13 | 1.13 | 1.13 |
| R1 | N | −0.88 | 0.41 | 1.00 | 2.14 | −0.88 | 0.41 | 0.00 | 1.28 | −1.28 |
| | W | 1.00 | 2.00 | 1.00 | 1.00 | 2.14 | 4.27 | 2.14 | 2.14 | 2.14 |
| R2 | N | −2.21 | 0.00 | 1.00 | 3.65 | −2.21 | 0.00 | −0.71 | 2.18 | −2.18 |
| | W | 1.00 | 2.00 | 1.00 | 1.00 | 0.67 | 1.34 | 0.67 | 0.67 | 0.67 |

| A | B | X3 | | | | X4 | | | |
|---|---|---|---|---|---|---|---|---|---|
| | | S3 | C3 | RG3 | P4 | S4 | C4 | RG4 | P5 |
| F1 | N | −0.15 | 0.25 | 0.39 | 0.44 | 0.0 | 0.25 | 0.39 | 0.64 |
| | W | 3.20 | 6.40 | 3.20 | 3.20 | 5.33 | 10.67 | 5.33 | 5.33 |
| F2 | N | 1.00 | 0.26 | 0.0 | −0.81 | 0.73 | 0.26 | 0.0 | −1.20 |
| | W | 2.82 | 5.63 | 2.82 | 2.82 | 0.0 | 0.0 | 0.0 | 0.0 |
| F3 | N | 1.00 | 0.50 | 0.32 | −0.55 | 0.82 | 0.50 | 0.32 | −0.81 |
| | W | 1.48 | 2.96 | 1.48 | 1.48 | 0.0 | 0.0 | 0.0 | 0.0 |
| F4 | N | 1.00 | 0.65 | 0.53 | −0.38 | 0.87 | 0.65 | 0.53 | −0.56 |
| | W | 1.13 | 2.26 | 1.13 | 1.13 | 0.0 | 0.0 | 0.0 | 0.0 |
| R1 | N | −0.88 | −0.23 | 0.00 | 0.72 | −0.64 | −0.23 | 0.00 | 1.05 |
| | W | 3.20 | 6.40 | 3.20 | 3.20 | 0.0 | 0.0 | 0.0 | 0.0 |
| R2 | N | −2.21 | −1.10 | −0.71 | 1.22 | −1.80 | −1.10 | −0.71 | 1.80 |
| | W | 0.67 | 1.34 | 0.67 | 0.67 | 0.0 | 0.0 | 0.0 | 0.0 |

Figure 8:
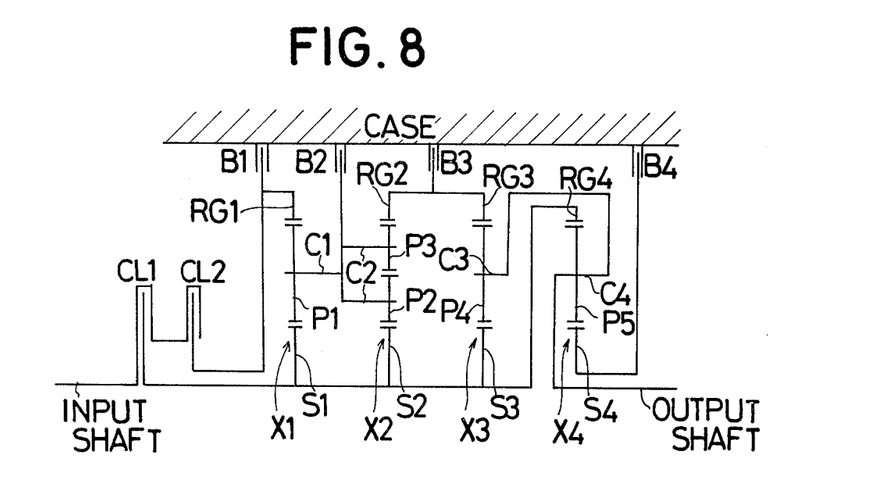
FIG. 8 is a diagram similar to FIG. 1 showing an eigth embodiment of the present invention.

An eighth embodiment of the present invention is illustrated within FIG. 8, wherein the fourth planetary gear set $X_4$ of the single pinion type is seen to be disposed between the third planetary gear set $X_3$ and the output shaft and includes a fourth ring gear $RG_4$ which is drivingly connected with the third sun gear $S_3$ and a fourth carrier $C_4$ which is drivingly connected with the third carrier $C_3$ as well as with the output shaft. A fourth brake $B_4$ is interposed between the fourth sun gear $S_4$ and the case so as to be capable of locking the fourth sun gear $S_4$ relative to the case when the brake $B_4$ is actuated.

Within this embodiment, the radial ratio within each speed range is $I_4 = 0.280$ and Table 8 shows the relationship between the gear ratios and the speed ranges as a result of the selective operation of the clutches and the brakes while Table 8A shows the relationship between the number of revolutions and the tangential forces characteristic of all the elements of the planetary gear sets within each speed range.

Table 8

| | CL1 | CL2 | B1 | B2 | B3 | B4 | GEAR RATIO |
|---|---|---|---|---|---|---|---|
| F1 | O | | | | O | | 3.82 |
| F2 | O | | | O | | | 2.01 |
| F3 | O | | O | | | | 1.53 |
| F4 | O | | | | | O | 1.28 |
| F5 | O | O | | | | | 1.00 |
| F6 | | O | | | | O | 0.49 |
| R1 | | | O | | O | | −4.33 |
| R2 | | | O | | O | | −0.91 |

Table 8A

| A | B | X1 | | | | X2 | | | | |
|---|---|---|---|---|---|---|---|---|---|---|
| | | S1 | C1 | RG1 | P1 | S2 | C2 | RG2 | P2 | P3 |
| F1 | N | 1.00 | −0.47 | −1.14 | −2.43 | 1.00 | −0.47 | 0.0 | −1.45 | 1.45 |
| | W | 0.00 | 0.00 | 0.00 | 0.00 | 0.00 | 0.00 | 0.00 | 0.00 | 0.00 |
| F2 | N | 1.00 | 0.00 | −0.45 | −1.65 | 1.00 | 0.00 | 0.32 | −0.99 | 0.99 |
| | W | 0.00 | 0.00 | 0.00 | 0.00 | 1.48 | 2.96 | 1.48 | 1.48 | 1.48 |
| F3 | N | 1.00 | 0.31 | 0.0 | −1.14 | 1.00 | 0.31 | 0.53 | −0.68 | 0.68 |
| | W | 0.53 | 1.06 | 0.53 | 0.53 | 1.13 | 2.26 | 1.13 | 1.13 | 1.13 |
| F4 | N | 1.00 | 0.56 | 0.37 | −0.72 | 1.00 | 0.56 | 0.70 | −0.43 | 0.43 |
| | W | 0.00 | 0.00 | 0.00 | 0.00 | 0.00 | 0.00 | 0.00 | 0.00 | 0.00 |
| F5 | N | 2.72 | 1.54 | 1.00 | −1.96 | 2.72 | 1.54 | 1.92 | −1.17 | 1.17 |
| | W | 1.00 | 2.00 | 1.00 | 1.00 | 2.14 | 4.27 | 2.14 | 2.14 | 2.14 |
| R1 | N | −0.88 | 0.41 | 1.00 | 2.14 | −0.88 | 0.41 | 0.0 | 1.28 | −1.28 |
| | W | 1.00 | 2.00 | 1.00 | 1.00 | 2.14 | 4.27 | 2.14 | 2.14 | 2.14 |
| R2 | N | −2.21 | 0.00 | 1.00 | 3.65 | −2.21 | 0.00 | −0.71 | 2.18 | −2.18 |
| | W | 1.00 | 2.00 | 1.00 | 1.00 | 0.67 | 1.34 | 0.67 | 0.67 | 0.67 |

| A | B | X3 | | | | X4 | | | |
|---|---|---|---|---|---|---|---|---|---|
| | | S3 | C3 | RG3 | P4 | S4 | C4 | RG4 | P5 |
| F1 | N | 1.00 | 0.26 | 0.0 | −0.81 | −2.37 | 0.26 | 1.00 | 2.05 |
| | W | 2.82 | 5.63 | 2.82 | 2.82 | 0.0 | 0.0 | 0.0 | 0.0 |
| F2 | N | 1.00 | 0.50 | 0.32 | −0.55 | −1.29 | 0.50 | 1.00 | 1.39 |

Table 8A-continued

|    |   |       |       |       |       |       |       |       |       |
|----|---|-------|-------|-------|-------|-------|-------|-------|-------|
|    | W | 1.48  | 2.96  | 1.48  | 1.48  | 0.0   | 0.00  | 0.00  | 0.00  |
| F3 | N | 1.00  | 0.65  | 0.53  | −0.38 | −0.58 | 0.65  | 1.00  | 0.96  |
|    | W | 1.13  | 2.26  | 1.13  | 1.13  | 0.0   | 0.0   | 0.0   | 0.0   |
| F4 | N | 1.00  | 0.78  | 0.70  | −0.24 | 0.0   | 0.78  | 1.00  | 0.61  |
|    | W | 0.00  | 0.00  | 0.00  | 0.00  | 1.00  | 2.00  | 1.00  | 1.00  |
| F5 | N | 2.72  | 2.13  | 1.92  | −0.66 | 0.0   | 2.13  | 2.72  | 1.66  |
|    | W | 2.14  | 4.27  | 2.14  | 2.14  | 1.89  | 3.79  | 1.89  | 1.89  |
| R1 | N | −0.88 | −0.23 | 0.0   | 0.72  | 2.09  | −0.23 | −0.88 | −1.81 |
|    | W | 3.20  | 6.40  | 3.20  | 3.20  | 0.0   | 0.00  | 0.00  | 0.00  |
| R2 | N | −2.21 | −1.10 | −0.71 | 1.22  | 2.86  | −1.10 | −2.21 | −3.08 |
|    | W | 0.67  | 1.34  | 0.67  | 0.67  | 0.0   | 0.00  | 0.00  | 0.00  |

Figure 8A:
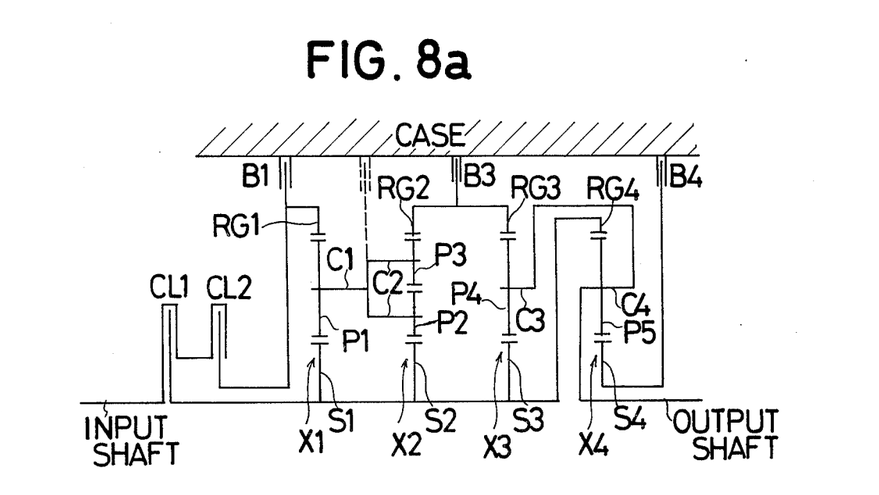
FIG. 8a is a diagram similar to FIG. 8 showing however a second brake $B_2$ being omitted therefrom.
Figure 8B:
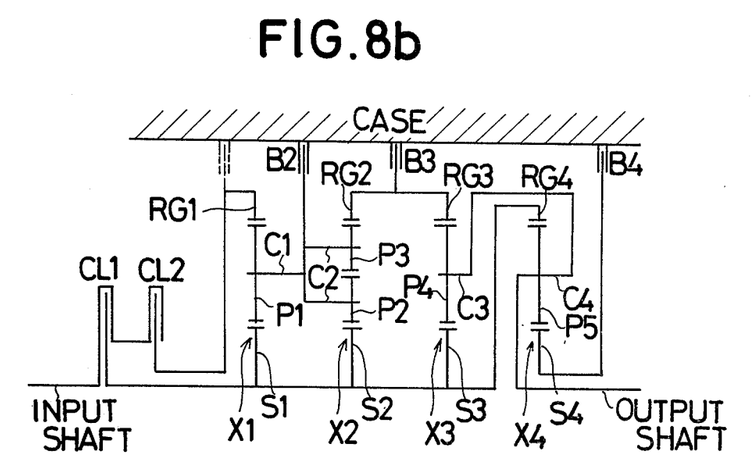
FIG. 8b is a diagram similar to FIG. 8 showing however a first brake $B_1$ being omitted therefrom.

In this embodiment, however, it is noted that one or more brakes $B_1$ through $B_4$ may be omitted to obtain at least five forward speed drive ranges and at least one reverse drive range. For example, FIG. 8a shows the speed change gear system omitting the second brake $B_2$ from FIG. 8 while FIG. 8b shows speed change gear system omitting the first brake $B_1$ from FIG. 8.

Figure 9:
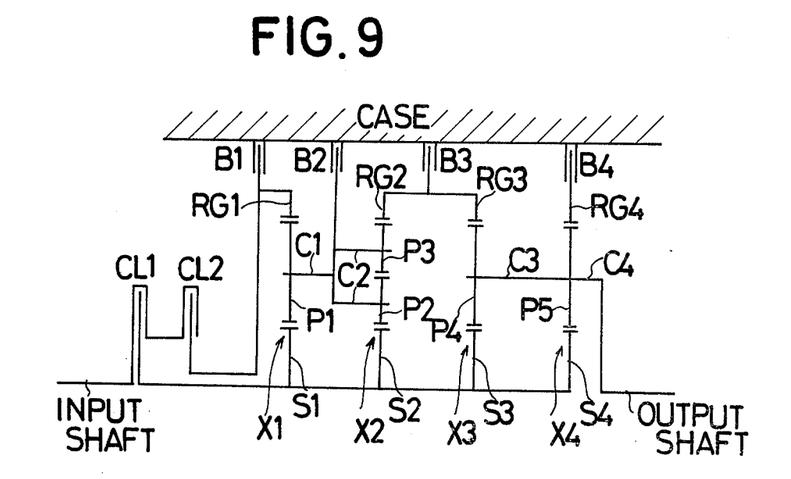
FIG. 9 is a diagram similar to FIG. 1 showing a ninth embodiment of the present invention.

A ninth embodiment of the present invention is illustrated within FIG. 9, wherein the fourth planetary gear set $X_4$ of the single pinion type is interposed between the third planetary gear set $X_3$ and the output shaft and is seen to include a fourth sun gear $S_4$ drivingly connected with the third sun gear $S_3$ and a fourth carrier drivingly connected with the third carrier $C_3$ as well as the output shaft. A fourth brake $B_4$ is interposed between a fourth ring gear $RG_4$ and the case so as to be capable of locking the fourth ring gear $RG_4$ relative to the case when the brake $B_1$ is actuated.

Within this embodiment, the radial ratio within each speed range is $I_4 = 0.280$ and Table 9 shows the relationship between the gear ratios and the speed ranges as a result of the selective operation of the clutches and brakes while Table 9A shows the relationship between the number of revolutions and the tangential forces characteristic of all the elements of the planetary gear sets within each speed range.

Table 9

|    | CL1 | CL2 | B1 | B2 | B3 | B4 | GEAR RATIO |
|----|-----|-----|----|----|----|----|------------|
| F1 | O   |     |    |    |    | O  | 4.57       |
| F2 | O   |     |    |    | O  |    | 3.82       |
| F3 | O   |     |    | O  |    |    | 2.01       |
| F4 | O   |     | O  |    |    |    | 1.53       |
| F5 | O   | O   |    |    |    |    | 1.00       |
| R1 |     | O   |    |    |    | O  | −5.76      |
| R2 |     | O   |    |    | O  |    | −4.33      |
| R3 |     | O   |    | O  |    |    | −0.91      |

Table 9A

| A | B | X1 | | | | X2 | | | |
|---|---|----|----|----|----|----|----|----|----|
|   |   | S1 | C1 | RG1 | P1 | S2 | C2 | RG2 | P2 | P3 |
| F1 | N | 1.00 | −0.56 | −1.26 | −2.57 | 1.00 | −0.56 | −0.06 | −1.54 | 1.54 |
|    | W | 0.00 | 0.00 | 0.00 | 0.00 | 0.00 | 0.00 | 0.00 | 0.00 | 0.00 |
| F2 | N | 1.00 | −0.47 | −1.14 | −2.43 | 1.00 | −0.47 | 0.0 | −1.45 | 1.45 |
|    | W | 0.0 | 0.0 | 0.0 | 0.0 | 0.0 | 0.0 | 0.0 | 0.0 | 0.0 |
| F3 | N | 1.00 | 0.00 | −0.45 | −1.65 | 1.00 | 0.00 | 0.32 | −0.99 | 0.99 |
|    | W | 0.00 | 0.0 | 0.0 | 0.0 | 1.48 | 2.96 | 1.48 | 1.48 | 1.48 |
| F4 | N | 1.00 | 0.31 | 0.0 | −1.14 | 1.00 | 0.31 | 0.53 | −0.68 | 0.68 |
|    | W | 0.53 | 1.06 | 0.53 | 0.53 | 1.13 | 2.26 | 1.13 | 1.13 | 1.13 |
| R1 | N | −0.79 | 0.44 | 1.00 | 2.04 | −0.79 | 0.44 | 0.05 | 1.22 | −1.22 |
|    | W | 1.00 | 2.00 | 1.00 | 1.00 | 2.14 | 4.27 | 2.14 | 2.14 | 2.14 |
| R2 | N | −0.88 | 0.41 | 1.00 | 2.14 | −0.88 | 0.41 | 0.0 | 1.28 | −1.28 |
|    | W | 1.00 | 2.00 | 1.00 | 1.00 | 2.14 | 4.27 | 2.14 | 2.14 | 2.14 |
| R3 | N | −2.21 | 0.00 | 1.00 | 3.65 | −2.21 | 0.00 | −0.71 | 2.18 | −2.18 |
|    | W | 1.00 | 2.00 | 1.00 | 1.00 | 0.67 | 1.34 | 0.67 | 0.67 | 0.67 |

| A | B | X3 | | | | X4 | | | |
|---|---|----|----|----|----|----|----|----|----|
|   |   | S3 | C3 | RG3 | P4 | S4 | C4 | RG4 | P5 |
| F1 | N | 1.00 | 0.22 | −0.06 | −0.86 | 1.00 | 0.22 | 0.0 | −0.61 |
|    | W | 0.00 | 0.00 | 0.00 | 0.00 | 3.57 | 7.14 | 3.57 | 3.57 |
| F2 | N | 1.00 | 0.26 | 0.0 | −0.81 | 1.00 | 0.26 | 0.06 | −0.57 |
|    | W | 2.82 | 5.63 | 2.82 | 2.82 | 0.00 | 0.0 | 0.0 | 0.0 |
| F3 | N | 1.00 | 0.50 | 0.32 | −0.55 | 1.00 | 0.50 | 0.36 | −0.39 |
|    | W | 1.48 | 2.96 | 1.48 | 1.48 | 0.00 | 0.0 | 0.0 | 0.0 |
| F4 | N | 1.00 | 0.65 | 0.53 | −0.38 | 1.00 | 0.65 | 0.56 | −0.27 |
|    | W | 1.13 | 2.26 | 1.13 | 1.13 | 0.00 | 0.0 | 0.0 | 0.0 |
| R1 | N | −0.79 | −0.17 | 0.05 | 0.68 | −0.79 | −0.17 | 0.0 | 0.48 |
|    | W | 2.14 | 4.27 | 2.14 | 2.14 | 6.76 | 13.52 | 6.76 | 6.76 |
| R2 | N | −0.88 | −0.23 | 0.0 | 0.72 | −0.88 | −0.23 | −0.05 | 0.51 |
|    | W | 3.20 | 6.40 | 3.20 | 3.20 | 0.00 | 0.0 | 0.0 | 0.0 |
| R3 | N | −2.21 | −1.10 | −0.71 | 1.22 | −2.21 | −1.10 | −0.79 | 0.86 |
|    | W | 0.67 | 1.34 | 0.67 | 0.67 | 0.00 | 0.0 | 0.0 | 0.0 |

Thus it may be seen that the present invention has important advantages over prior art speed change gear systems in that the speed change gear system of the present invention is capable of shifting between at least four forward drive speeds and one reverse drive speed, the same being readily and simply realized, the effect of which will no doubt contribute greatly to development of the motor vehicle industry.

Obviously, numerous modifications and variations of the present invention are possible in light of the above teachings. It is to be understood therefore that within the scope of the appended claims, the present invention may be practiced otherwise than as specifically described herein.

What is claimed is:

1. A speed change gear system comprising:

an input shaft;
a first sun gear;
first planetary pinion gears engaged with said first sun gear;
a first ring gear engaged with said first planetary pinion gear;
a first carrier rotatably supporting said first planetary pinion gears;
a second sun gear;
second planetary pinion gears engaged with said second sun gears;
third planetary pinion gears engaged with second planetary pinion gears;
a second ring gear engaged with said third planetary pinion gears;
a second carrier rotatably supporting said second and third planetary pinion gears;
said second carrier being drivingly connected with said first carrier;
a third ring gear drivingly connected with said second ring gear;
fourth planetary pinion gears engaged with said third ring gear;
a third sun gear engaged with said fourth planetary pinion gears and being drivingly connected with said second sun gear;
a third carrier rotatably supporting said fourth planetary pinion gears;
a first clutch for simultaneously coupling or uncoupling said first, second, and third sun gears to or from said input shaft;
a second clutch for coupling or uncoupling said first ring gear to or from said input shaft;
an output shaft dynamically and intergrally connected to said third carrier;
a first brake means capable of being actuated for locking said first ring gear to said transmission case, a second brake means capable of being actuated for simultaneously locking said first and second carriers to said case, and a third brake means capable of being actuated for simultaneously locking said second and third ring gears to said case.

2. A speed change gear system as set forth in claim 1, further comprising:
a fourth ring gear drivingly connected with said second and third ring gears;
fifth planetary pinion gears engaged with said fourth ring gear;
a fourth carrier rotatably supporting said fifth planetary pinion gears;
a fourth sun gear engaged with said fifth planetary pinion gears and dynamically and integrally connected with said output shaft; and
a further brake means capable of being actuated for locking said fourth carrier to said case.

3. A speed change gear system as set forth in claim 1 further comprising:
a fourth sun gear drivingly connected with said second and third ring gears;
fifth planetary pinion gears engaged with said fourth sun gear;
a fourth carrier rotatably supporting said fifth planetary pinion gears;
a fourth ring gear dynamically and integrally connected with said output shaft; and
a further brake means capable of being actuated for locking said fourth carrier to said case.

4. A speed change gear system as set forth in claim 1 further comprising:
a fourth ring gear drivingly connected with said first, second, and third sun gears;
fifth planetary pinion gears engaged with said fourth ring gear;
a fourth sun gear engaged with said fifth planetary pinion gears;
a fourth carrier rotatably supporting said fifth planetary pinion gears and dynamically and integrally connected with said third carrier and said output shaft; and
a further brake means capable of being actuated for locking said fourth sun gear to said case.

5. A speed change gear system as set forth in claim 1 further comprising:
a fourth sun gear drivingly connected with said first, second and third sun gears;
fifth planetary pinion gears engaged with said fourth sun gear;
a fourth ring gear engaged with said fifth planetary pinion gears;
a fourth carrier rotatably supporting said fifth planetary pinion gears and dynamically and integrally connected with said third carrier and said output shaft; and
a further brake means capable of being actuated for locking said fourth ring gear to said case.

* * * * *